US012407990B2

(12) United States Patent
Matsui

(10) Patent No.: US 12,407,990 B2
(45) Date of Patent: Sep. 2, 2025

(54) PANEL SPEAKER

(71) Applicant: DENSO TEN Limited, Hyogo (JP)

(72) Inventor: Kazuki Matsui, Kobe (JP)

(73) Assignee: DENSO TEN Limited, Kobe (JP)

( * ) Notice: Subject to any disclaimer, the term of this patent is extended or adjusted under 35 U.S.C. 154(b) by 300 days.

(21) Appl. No.: 18/184,206

(22) Filed: Mar. 15, 2023

(65) Prior Publication Data

US 2024/0137708 A1 Apr. 25, 2024
US 2024/0236581 A9 Jul. 11, 2024

(30) Foreign Application Priority Data

Oct. 21, 2022 (JP) ................................ 2022-169247

(51) Int. Cl.
*H04R 17/00* (2006.01)

(52) U.S. Cl.
CPC ......... *H04R 17/00* (2013.01); *H04R 2499/15* (2013.01)

(58) Field of Classification Search
CPC ...... H04R 17/00; H04R 2499/15; H04R 5/02; H04R 1/26; H04R 7/04; H04R 2440/05; H04R 9/06; H04R 9/02; H04R 2400/11; H04R 1/288; H04R 1/2803; H04R 1/028; G09F 9/00
See application file for complete search history.

(56) References Cited

U.S. PATENT DOCUMENTS

| | | | | | |
|---|---|---|---|---|---|
| 10,200,772 | B2 * | 2/2019 | Ahn | ...................... | G06F 1/1688 |
| 10,448,131 | B1 * | 10/2019 | Tanaka | .................. | H04R 1/028 |
| 12,207,045 | B2 * | 1/2025 | Ikeda | ..................... | H04R 7/045 |
| 2017/0280246 | A1 * | 9/2017 | Choi | ...................... | H04R 1/288 |
| 2019/0045287 | A1 * | 2/2019 | Lee | .......................... | H04R 1/26 |

FOREIGN PATENT DOCUMENTS

| | | | |
|---|---|---|---|
| JP | 2007-312269 | A | 11/2007 |
| JP | 2018-93468 | A | 6/2018 |
| JP | 2019-186829 | A | 10/2019 |
| JP | 2019-191587 | A | 10/2019 |

* cited by examiner

*Primary Examiner* — Angelica M McKinney
(74) *Attorney, Agent, or Firm* — Oliff PLC

(57) ABSTRACT

A panel speaker includes: a single vibration panel formed by adhering one surface of a first panel and one surface of a second panel; a first vibration actuator configured to drive and vibrate the single vibration panel; and a second vibration actuator configured to drive and vibrate the single vibration panel, the single vibration panel has, in a plan view, a first non-adhesive region and a second non-adhesive region in both of which the first panel and the second panel are not bonded to each other, and the first vibration actuator is coupled to other surface of the second panel to drive the first non-adhesive region, and the second vibration actuator is coupled to the other surface of the second panel to drive the second non-adhesive region.

19 Claims, 12 Drawing Sheets

PANEL SPEAKER

CROSS-REFERENCE TO RELATED APPLICATION

This application is based on and claims priority under 35 USC 119 from Japanese Patent Application No. 2022-169247 filed on Oct. 21, 2022.

TECHNICAL FIELD

The present invention relates to a panel speaker.

BACKGROUND ART

There has been a display speaker that turns a display into a speaker by vibrating a display panel of the display using an actuator (vibration actuator) having a piezoelectric element. In a display speaker, a vibration actuator is attached to the back surface of the display panel (vibration panel). Thus, the vibration of the vibration actuator can be transmitted to the display panel. The display speaker is an example of panel speaker.

As conventional arts, JP2019-191587A and JP2018-093468A are known.

In the display panel, a plurality of (for example, two) independently controlled vibration actuators are attached to the display panel to obtain a stereophonic display panel that outputs stereophonic sound. In some cases, a transmission panel is bonded to the back side of the display panel. Details of the transmission panel will be described later. The transmission panel is fixed to the display panel by a double-sided adhesive tape or the like. The vibration actuator is attached to the transmission panel and integrally drives the transmission panel and the display panel. That is, the transmission panel and the display panel are integrated to form the vibration panel. In a display panel attached with two vibration actuators, when one vibration actuator is vibrated, not only the periphery of the vibration actuator of the corresponding vibration panel but also the periphery of the other vibration actuator of the vibration panel may be vibrated. Moreover, in the display panel, when the other vibration actuator is vibrated, not only the periphery of the vibration actuator of the corresponding vibration panel but also the periphery of the one vibration actuator of the vibration panel may be vibrated. Therefore, in this case, the sound output from the display panel may be monaural sound instead of stereophonic sound. That is, the left/right separation (left/right average vibration ratio) in the display panel under stereophonic driving is low.

SUMMARY OF INVENTION

An object of the technique of the present disclosure is to provide a panel speaker that improves the quality of output sound (in particular, the separation between left and right channels of stereophonic sound).

As aspects of the invention, the following means are adopted.

According to the first aspect, there is provided a panel speaker including: a single vibration panel formed by adhering one surface of a first panel and one surface of a second panel; a first vibration actuator configured to drive and vibrate the single vibration panel; and a second vibration actuator configured to drive and vibrate the single vibration panel, wherein the single vibration panel has, in a plan view, a first non-adhesive region and a second non-adhesive region in both of which the first panel and the second panel are not bonded to each other, and the first vibration actuator is coupled to other surface of the second panel to drive the first non-adhesive region of the single vibration panel, and the second vibration actuator is coupled to the other surface of the second panel to drive the second non-adhesive region of the single vibration panel.

According to the disclosed technique, it is possible to provide a panel speaker that improves the quality of output sound (in particular, the separation between left and right channels of stereophonic sound).

DETAILED DESCRIPTION OF THE INVENTION

Hereinafter, embodiments will be described with reference to the drawings. A configuration of the embodiments is illustrative, and the configuration of the invention is not limited to a specific configuration of the embodiments of the disclosure. In accordance with the embodiments of the invention, the specific configuration according to the embodiments may be adopted as appropriate.

Here, a case where a plurality of vibration actuators are attached to a transmission panel, the transmission panel is provided on a display panel of a display, and the display is caused to function as a display speaker under stereophonic driving will be described. A panel speaker is a device that outputs (emits) sound waves (sound) from the display panel by vibrating the display panel with the vibration actuators. The display speaker is an example of the panel speaker. The panel speaker is, for example, a speaker that outputs sound by vibrating a planar panel (vibration panel) such as a display panel.

EMBODIMENTS

Comparative Example

Figure 1:
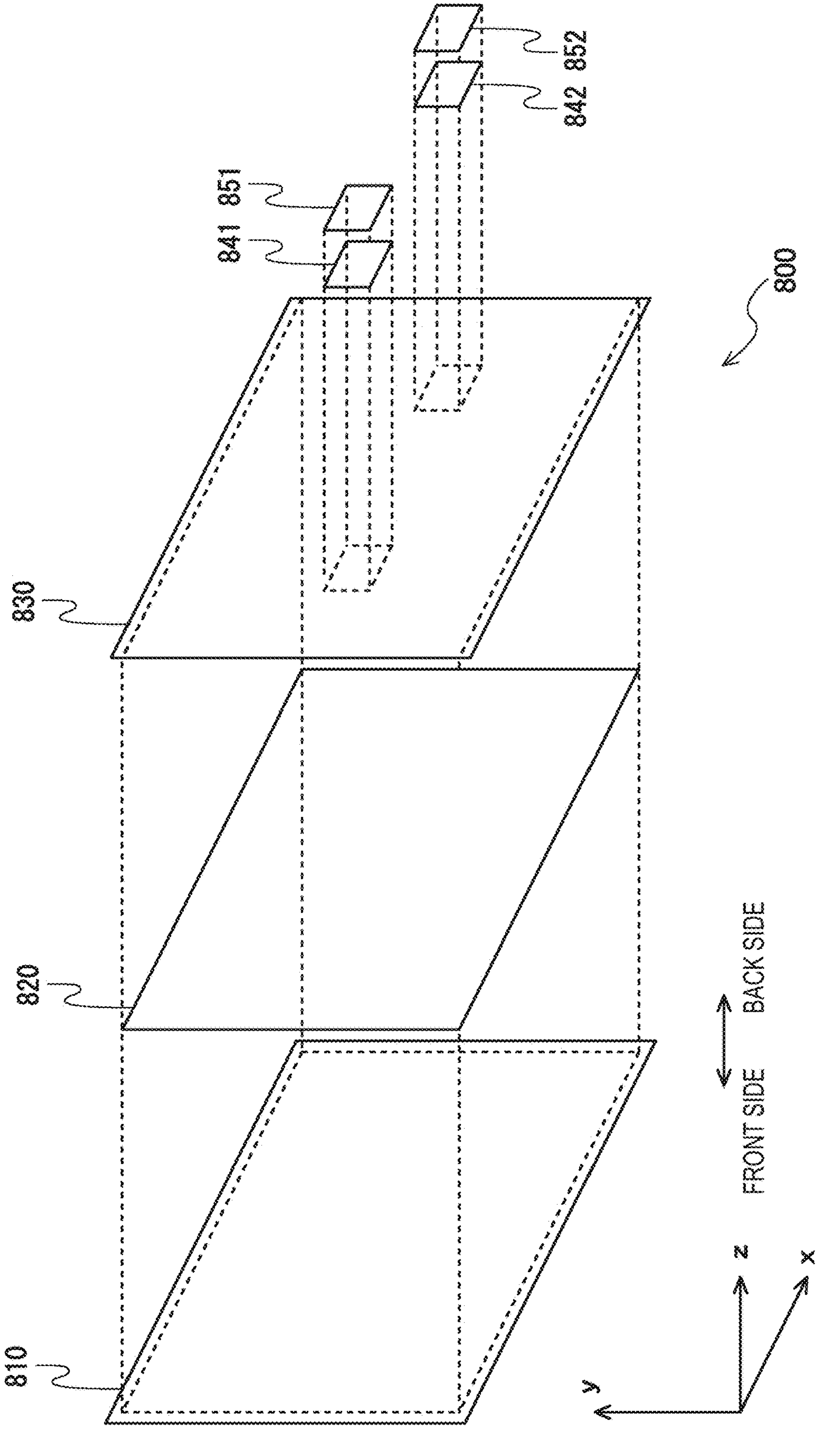
FIG. 1 is an exploded perspective view of a display speaker 800.
Figure 2:
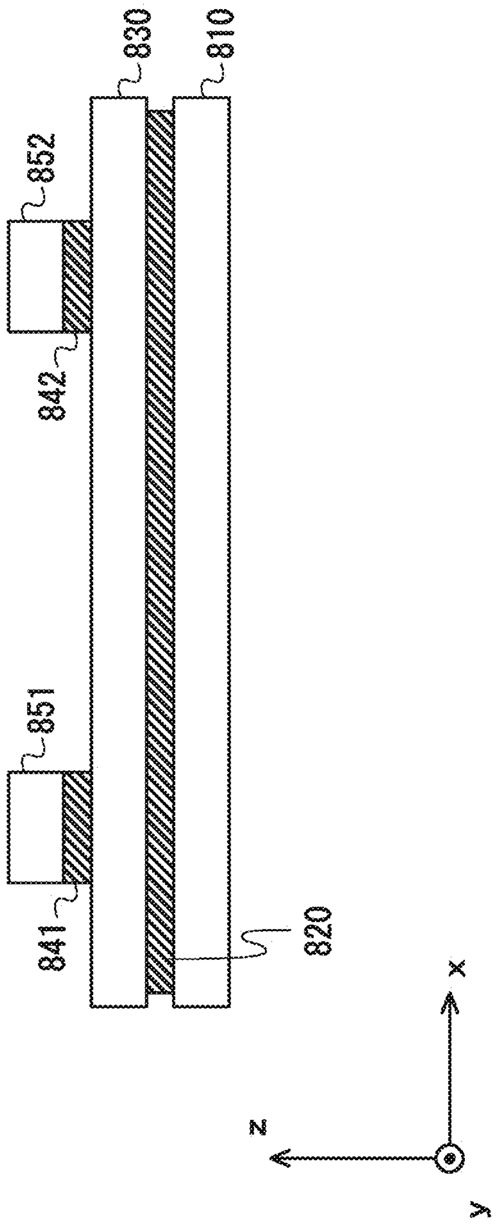
FIG. 2 is a cross-sectional view of a plane parallel to an xz plane passing through a first vibration actuator 851 and a second vibration actuator 852 of the display speaker 800.
Figure 3:
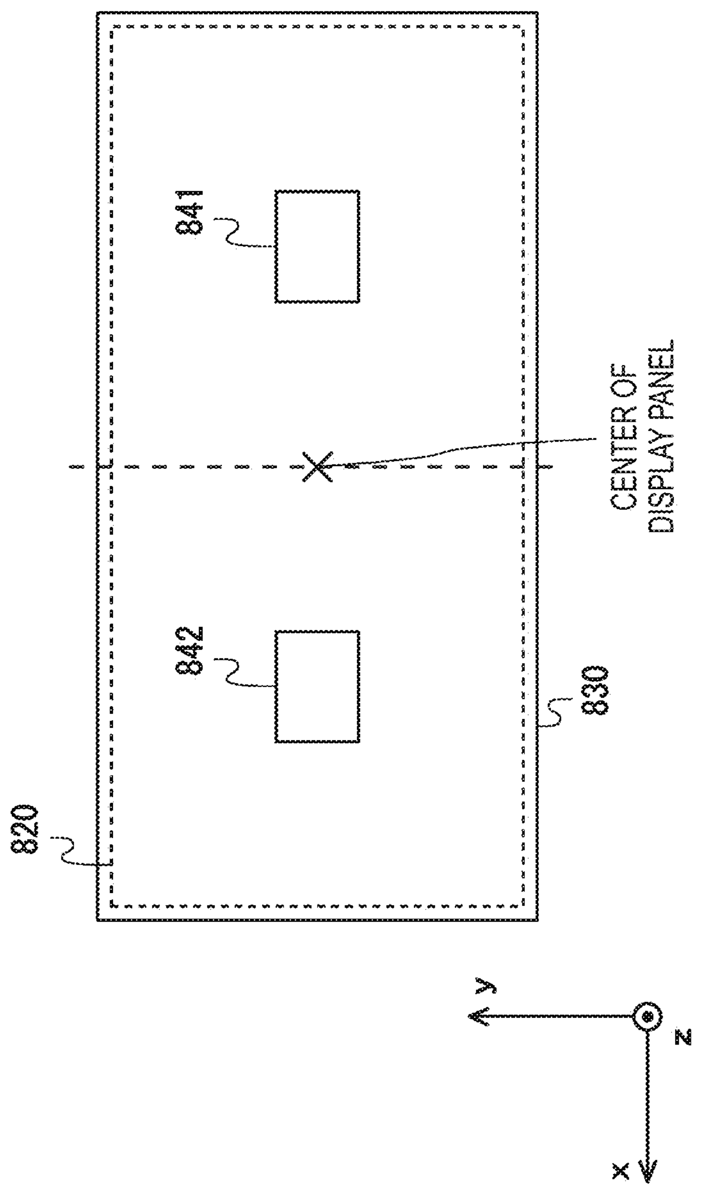
FIG. 3 is a back view of a transmission panel 830, an adhesive layer 820, a first coupling portion 841, and a second coupling portion 842.

FIGS. 1,2, and 3 are diagrams illustrating a configuration example of a display speaker 800 according to a comparative example of the present embodiment. FIG. 1 is an exploded perspective view of the display speaker 800. The display speaker 800 includes a display panel 810, an adhesive layer 820, a transmission panel 830, a first coupling portion 841, a second coupling portion 842, a first vibration actuator 851, and a second vibration actuator 852. Here, in a plan view of the display panel 810 from the front side, a direction from left to right is defined as an x direction, a direction from bottom to top is defined as a y direction, and a direction from front to back is defined as a z direction. The x direction, the y direction, and the z direction are orthogonal to one another. FIG. 2 is a cross-sectional view of a plane parallel to an xz plane passing through the first vibration actuator 851 and the second vibration actuator 852 of the display speaker 800. FIG. 3 is a back view of the transmission panel 830, the adhesive layer 820, the first coupling portion 841, and the second coupling portion 842.

The display panel 810 is a plate-shaped rectangular panel. Each side of the outer shape of the display panel 810 is parallel to the x-axis or the y-axis.

The adhesive layer 820 joins the back side of the display panel 910 and the front side of the transmission panel 930. In the example of FIG. 1, the adhesive layer 820 has substantially the same shape and size as the display panel 810 and the transmission panel 830. The adhesive layer 820 is, for example, a double-sided adhesive tape. In the example of FIG. 1, the adhesive layer 820 is rectangular.

The transmission panel 830 is disposed on the back side of the display panel 810, between the display panel 810 and the first vibration actuator 851, and between the display panel 810 and the second vibration actuator 852. The transmission panel 830 is a rectangular panel having substantially the same size as the display panel 810 when viewed from the front. The transmission panel 830 is, for example, a metal plate such as an aluminum plate. The transmission panel 830 has functions of supporting and reinforcing the display panel 810 from the back side, dissipating heat generated in the display panel 810, shielding electromagnetic noise generated in the display panel 810, and the like. The transmission panel 830 does not necessarily have all of the above-described roles, and may be, for example, any insulator such as a glass plate or a plastic plate instead of a metal plate as long as intended for only reinforcement. The transmission panel 830 transmits the vibrations of the first vibration actuator 851 and the second vibration actuator 852 to the display panel 810. In other words, the transmission panel 830 and the display panel 810 are integrally driven by the first vibration actuator 851 and the second vibration actuator 852, and constitute a vibration panel that outputs sound waves from the surface closer to the display panel 810. The functions of the transmission panel 830 and the display panel 810 are common to the transmission panel and the display panel of all the embodiments described below.

The first coupling portion 841 is, for example, disposed over the entire front surface side of the first vibration actuator 851, and couples the back surface of the transmission panel 830 and the front surface of the first vibration actuator 851. The first coupling portion 841 is, for example, a double-sided adhesive tape. The first coupling portion 841 is disposed at a position translated in the −x direction from the center of the transmission panel 830 in a plan view. The second coupling portion 842 is, for example, disposed over the entire front surface side of the second vibration actuator 852, and couples the back surface of the transmission panel 830 and the front surface of the second vibration actuator 852. The second coupling portion 842 is, for example, a double-sided adhesive tape. The second coupling portion 842 is disposed at a position translated in the +x direction from the center of the transmission panel 830 in a plan view. The first coupling portion 841 and the second coupling portion 842 are equal in distance from the center of the display panel 810 (transmission panel 830) in the x direction. The first coupling portion 841 and the second coupling portion 842 are located at positions in line symmetry with respect to a straight line passing through the center of the display panel 810 and parallel to the y-axis as a center axis of symmetry.

The first vibration actuator 851 and the second vibration actuator 852 are disposed on the back surface side of the transmission panel 830. The first vibration actuator 851 and the second vibration actuator 852 are plate-shaped rectangular members smaller than the transmission panel 830. The first vibration actuator 851 and the second vibration actuator 852 are, for example, piezoelectric elements. The first vibration actuator 851 and the second vibration actuator 852 expand and contract according to an applied driving voltage to vibrate. The first vibration actuator 851 and the second vibration actuator 852 are controlled independently of each other.

In the display speaker 800, when the first vibration actuator 851 vibrates, not only the periphery of the first vibration actuator 851 of the transmission panel 830 but also the periphery of the second vibration actuator 852 of the transmission panel 830 vibrates. In the display speaker 800, when the second vibration actuator 852 vibrates, not only the periphery of the second vibration actuator 852 of the transmission panel 830 but also the periphery of the first vibration actuator 851 of the transmission panel 830 vibrates. Thus, even if separate signals are input to the first vibration actuator 851 and the second vibration actuator 852 to vibrate them in order to output stereophonic sound, the display speaker 800 outputs sound such as monaural sound. That is, in the display speaker 800, the left/right separation of sound (left/right average vibration ratio) is low. At this time, the left/right average vibration ratio is 1.1. The left/right average vibration ratio is, for example, a ratio (PL/PR) of an average vibration magnitude (amplitude or acceleration) PL in a region on the left side of the transmission panel 830 (in the vicinity of the first vibration actuator 851 of the transmission panel 830) to an average vibration magnitude (amplitude or acceleration) PR in a region on the right side of the transmission panel 830 (in the vicinity of the second vibration actuator 852 of the transmission panel 830) when the left vibration actuator (the first vibration actuator 851) is vibrated and the right vibration actuator (the second vibration actuator 852) is not vibrated. Here, the "average magnitude of vibration in a region" can be defined as, for example, a value obtained by integrating the magnitude of vibration in micro regions included in the region over the entire region, or a value obtained by dividing the value by the area of the region. In a simplified manner, it can be defined as the sum of the magnitudes of vibration at several measurement points included in the region, or a value obtained by dividing the sum by the number of the measurement points. When the left/right average vibration ratio (PL/PR) is 1 or more, the left/right separation of sound increases as the left/right average vibration ratio is larger, and decreases as the left/right average vibration ratio is closer to 1. When the right vibration actuator (second vibration actuator 852) is vibrated and the left vibration actuator (first vibration actuator 851) is not vibrated, the left/right average vibration ratio can be defined by PR/PL.

Configuration Example

Figure 4:
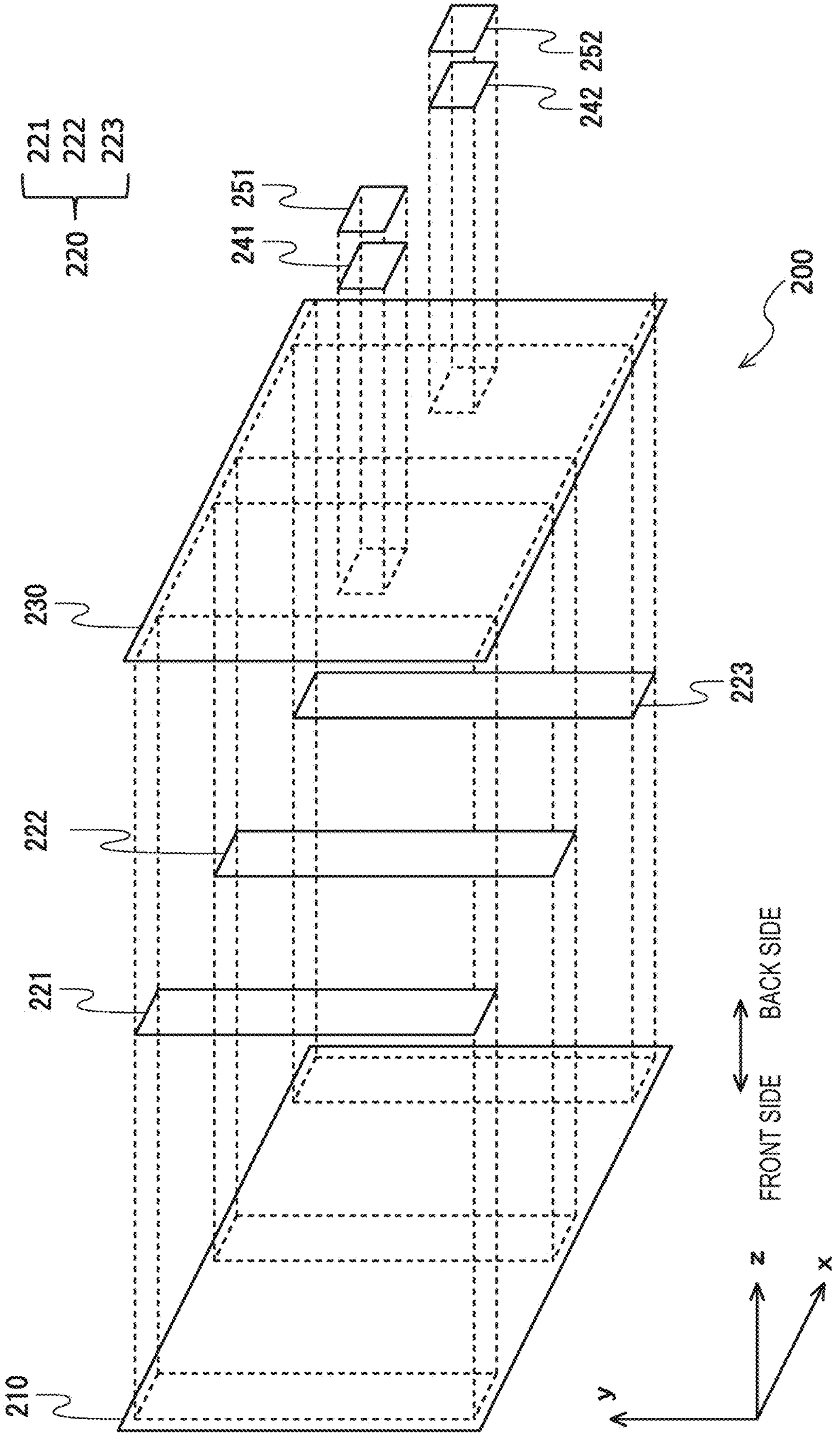
FIG. 4 is an exploded perspective view of a display speaker 200.
Figure 5:
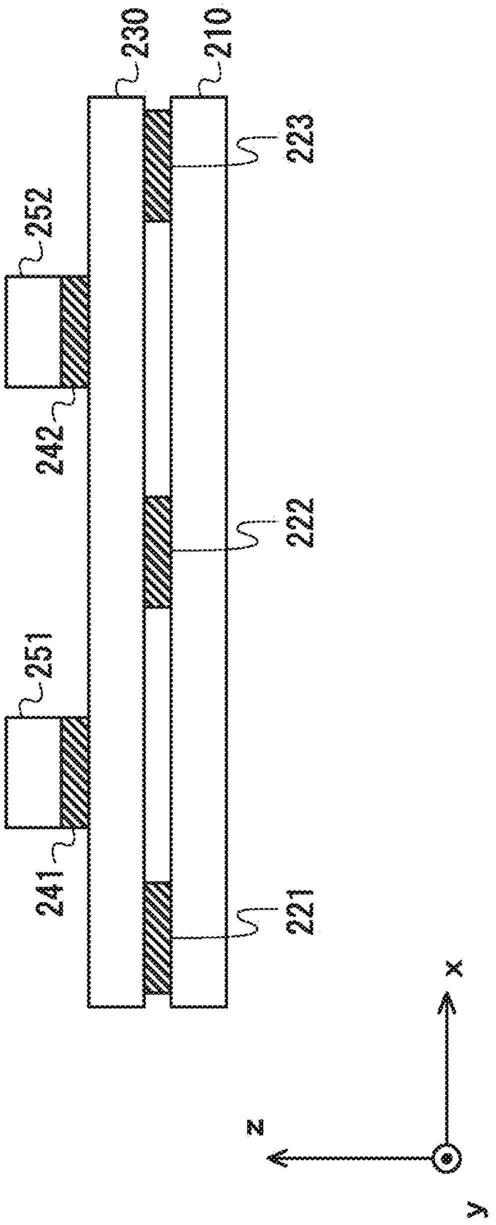
FIG. 5 is a cross-sectional view of a plane parallel to the xz plane passing through a first vibration actuator 251 and a second vibration actuator 252 of the display speaker 200.
Figure 6:
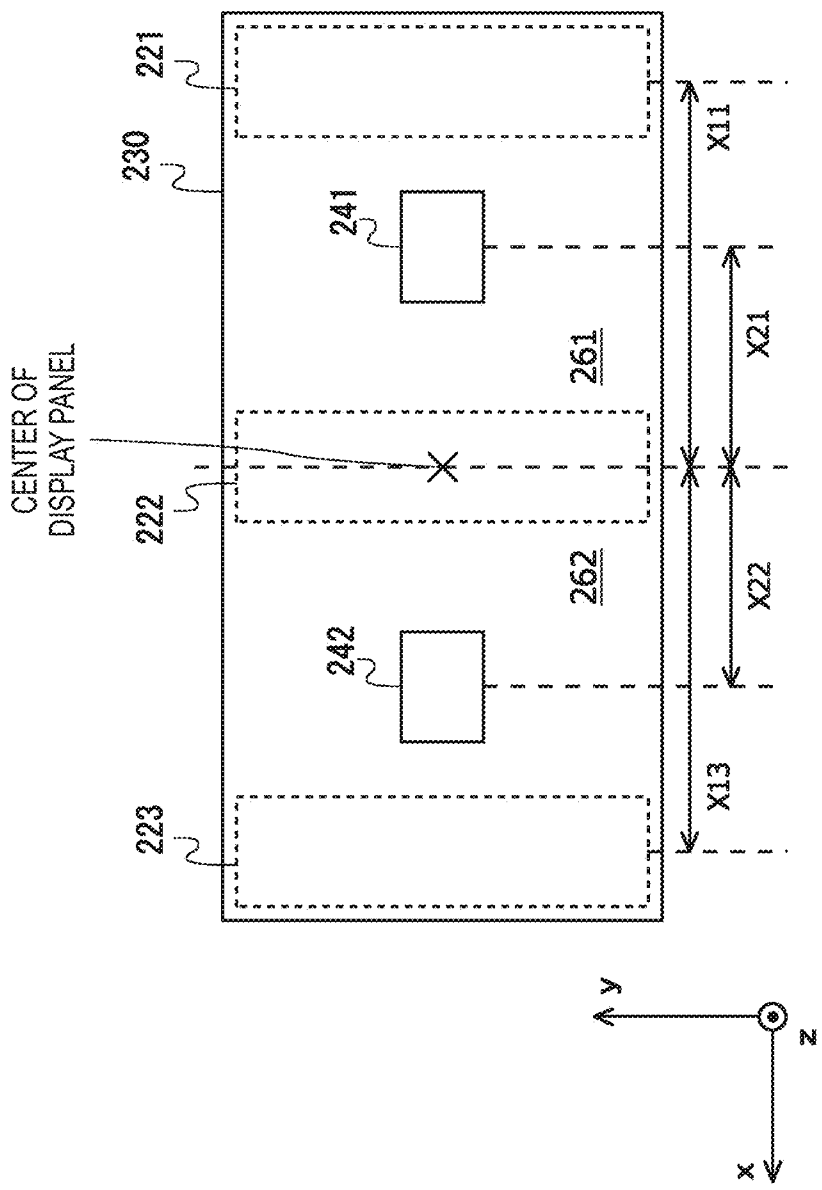
FIG. 6 is a back view of a transmission panel 230, an adhesive layer 220, a first coupling portion 241, and a second coupling portion 242.

FIGS. 4,5, and 6 are diagrams illustrating configuration examples of the display speaker 200 of the present embodiment. FIG. 4 is an exploded perspective view of the display speaker 200. The display speaker 200 includes a display panel 210, an adhesive layer 220, a transmission panel 230, a first coupling portion 241, a second coupling portion 242, a first vibration actuator 251, and a second vibration actuator 252. Here, in a plan view of the display panel 210 from the front side, a direction from left to right is defined as the x direction, a direction from bottom to top is defined as the y direction, and a direction from front to back is defined as the z direction. The x direction, the y direction, and the z direction are orthogonal to one another. FIG. 5 is a cross-sectional view of a plane parallel to the xz plane passing through the first vibration actuator 251 and the second vibration actuator 252 of the display speaker 200. FIG. 6 is a back view of the transmission panel 230, the adhesive layer 220, the first coupling portion 241, and the second coupling portion 242. Here, the x direction is the longitudinal direction of the display panel 210, and they direction is the lateral direction of the display panel 210.

The display panel 210 is a plate-shaped rectangular panel. Each side of the outer shape of the display panel 210 is parallel to the x-axis or the y-axis. That is, two opposite sides of the rectangle of the outer shape of the display panel 210 are parallel to a first direction (x direction), and the other two opposite sides are parallel to a second direction (y direction) orthogonal to the first direction. The display panel 210 is, for example, a planar glass panel or an organic light emitting diode (OLED) panel. The display panel 210 is joined to the transmission panel 230 via the adhesive layer 220. The display panel 210 is an example of a first panel. The shape of the display panel 210 and the like is not limited to a rectangular shape, and may be other shapes such as a quadrangle shape other than rectangle, a triangular shape, a polygonal shape, an elliptical shape, and a circular shape. The display panel 210 is, for example, a display panel for displaying character information and images by a computer or the like.

The adhesive layer 220 is divided into a plurality of regions, and joins the back side of the display panel 210 and the front side of the transmission panel 230. In the example of FIG. 4, the adhesive layer 220 includes a first adhesive region 221, a second adhesive region 222, and a third adhesive region 223. Each adhesive region of the adhesive layer 220 is, for example, a double-sided adhesive tape. Each adhesive region of the adhesive layer 220 may be an adhesive. The adhesive regions are arranged at different positions so as not to overlap each other in a plan view (when viewed from the front side or the back side, and when viewed from a direction orthogonal to the x direction and the y direction). The first adhesive region 221, the second adhesive region 222, and the third adhesive region 223 are strip-shaped rectangles parallel to the y-axis. The first adhesive region 221, the second adhesive region 222, and the third adhesive region 223 extend from the upper portion to the lower portion of the display panel 210 (transmission panel 230). The first adhesive region 221, the second adhesive region 222, and the third adhesive region 223 are parallel to each other. The first adhesive region 221 and the third adhesive region 223 have the same shape. The first adhesive region 221 and the second adhesive region 222 may have the same shape. Each of the first adhesive region 221, the second adhesive region 222, and the third adhesive region 223 has a width in the y direction larger than a width in the x direction. Here, the y direction is the longitudinal direction of the first adhesive region 221, the second adhesive region 222, and the third adhesive region 223. In the x direction, a distance (X11) between the first adhesive region 221 and the center of the display panel 210 is equal to a distance (X13) between the third adhesive region 223 and the center of the display panel 210. In a plan view, the first adhesive region 121 and the third adhesive region 223 are located at positions in point symmetry with respect to the center of the display panel 210. The shape of the second adhesive region 222 is in line symmetry with respect to a straight line passing through the center of the display panel 210 and parallel to the y-axis as the center axis of symmetry. The same applies to the relationship between the center of the transmission panel 130 and the adhesive regions. The display panel 210 and the transmission panel 230 are not joined in portions other than the respective adhesive regions of the adhesive layer 220 between the display panel 210 and the transmission panel 230. That is, the portion other than the regions of the adhesive layer 220 between the display panel 210 and the transmission panel 230 is, for example, a gap (non-adhesive region). The portion other than the respective adhesive regions of the adhesive layer 220 between the display panel 210 and the transmission panel 230 is non-adhesive regions. Unlike the comparative example described above, in a plan view, the portion overlapping the first vibration actuator 251 (first coupling portion 241) and the second vibration actuator 252 (second coupling portion 242) does not include adhesive regions of the adhesive layer 220. The number of adhesive regions of the adhesive layer 220 is not limited to three. The distance between any position and region (for example, the adhesive region) is the distance between the position and the center of the region. The center of the rectangle of the display panel 210 and the like is obtained as, for example, the intersection position of the diagonal lines of the rectangle.

The center used here is not limited to the geometric center, and may be within a certain range including the geometric center. The certain range including the geometric center is, for example, a range of a circle having a radius of 2 cm around the geometric center, or a range of a circle having a radius of 5% of the maximum width of the display panel 210 around the geometric center. The center of the display panel 210 or the like may be defined by the center of gravity, the incenter, the circumcenter, the intersection of the center lines of the widths in two orthogonal directions, or the like. The first adhesive region 221, the second adhesive region 222, and the third adhesive region 223 may not be parallel to the outer shape of the display panel 210. The shape of each adhesive region is not limited to that described herein. The adhesive regions are in line symmetry with respect to the straight line passing through the center of the display panel 210 and parallel to the y-axis. The adhesive layer 220 does not include a non-adhesive region. The adhesive layer 220 partitions the longitudinal direction of the display panel 210 (x direction) into a plurality of non-adhesive regions. In general, the longitudinal direction of the display panel 210 is the left-right direction of the display panel 210. By providing the plurality of non-adhesive regions in this direction, the display speaker 200 can output sound from the left side based on the sound signal on the left (left sound signal) and output sound from the right side based on the sound signal on the right (right sound signal).

The transmission panel 230 is disposed on the back side of the display panel 210, between the display panel 210 and the first vibration actuator 251, and between the display panel 210 and the second vibration actuator 252. The transmission panel 230 is a rectangular panel having substantially the same size as the display panel 210 when viewed from the front (in a plan view). The transmission panel 230 transmits the vibrations of the first vibration actuator 251 and the second vibration actuator 252 to the display panel 210. The transmission panel 230 is, for example, a metal plate such as an aluminum plate. In a plan view, the position of the center of the transmission panel 230 and the position of the center of the display panel 210 are the same. The transmission panel 230 is an example of a second panel.

The first coupling portion 241 is, for example, disposed over the entire front surface side of the first vibration actuator 251, and couples the back surface of the transmission panel 230 and the front surface of the first vibration actuator 251. The second coupling portion 242 is, for example, disposed over the entire front surface side of the second vibration actuator 252, and couples the back surface of the transmission panel 230 and the front surface of the second vibration actuator 252. The first coupling portion 241 and the second coupling portion 242 are, for example, double-sided adhesive tapes. The first coupling portion 241 and the second coupling portion 242 may be an adhesive. The first coupling portion 241 and the second coupling portion 242 are examples of coupling portions. Instead of the first coupling portion 241 and the second coupling portion 242, bosses pressed into the transmission panel 230 and screws fixing the first vibration actuator 251 and the second vibration actuator 252 to the boss may serve as coupling portions. At this time, screw holes for the screws to pass through are provided in the first vibration actuator 251 and the second vibration actuator 252. The transmission panel 130, the first vibration actuator 251, and the second vibration actuator 252 are coupled by the coupling portions. The coupling portions that couple the transmission panel 130 to the first vibration actuator 251 and the second vibration actuator 252 are not limited to those described herein, and the coupling may be achieved by another configuration. The coupling portions are in line symmetry with respect to the straight line passing through the center of the display panel 210 and parallel to the y-axis.

The first vibration actuator 251 and the second vibration actuator 252 are disposed on the back surface side of the transmission panel 230. The first vibration actuator 251 and the second vibration actuator 252 are plate-shaped rectangular members smaller than the transmission panel 230. The first vibration actuator 251 and the second vibration actuator 252 are, for example, piezoelectric elements. The first vibration actuator 251 and the second vibration actuator 252 expand and contract according to an applied driving voltage to vibrate. The first vibration actuator 251 and the second vibration actuator 252 are controlled independently of each other. The first vibration actuator 251 is disposed, for example, at a position translated in the −x direction from the center of the transmission panel 230 in a plan view. Here, the distance in the x direction between the center of the transmission panel 230 and the first vibration actuator 251 is X21. That is, the first vibration actuator 251 is disposed on a straight line that passes through the center of the transmission panel 250 and is parallel to the x direction. The second coupling portion 242 is disposed at a position translated in the +x direction from the center of the transmission panel 230 in a plan view. Here, the distance in the x direction between the center of the transmission panel 230 and the second vibration actuator 252 is X22. That is, the second vibration actuator 252 is disposed on a straight line that passes through the center of the transmission panel 250 and is parallel to the x direction. The first vibration actuator 251 and the second vibration actuator 252 are equal in distance from the center of the display panel 210 (transmission panel 230) in the x direction (X21=X22). The first vibration actuator 251 and the second vibration actuator 252 are located at positions in line symmetry with respect to a straight line passing through the center of the display panel 210 and parallel to the y-axis as a center axis of symmetry. The first vibration actuator 251 and the second vibration actuator 252 are examples of a vibration unit. The first vibration actuator 251 and the second vibration actuator 252 may have a shape other than a rectangular shape. For example, the display speaker 200 can output stereophonic sound by inputting a left sound signal of stereophonic sound to the first vibration actuator 251 and inputting a right sound signal of stereophonic sound to the second vibration actuator 252.

In a plan view, the first vibration actuator 251 is disposed in the non-adhesive region between the first adhesive region 221 and the second adhesive region 222 (first non-adhesive region 261). In a plan view, the second vibration actuator 252 is disposed in the non-adhesive region between the third adhesive region 223 and the second adhesive region 222 (second non-adhesive region 262). In a plan view, the first non-adhesive region 261 and the second non-adhesive region 262 are different non-adhesive regions partitioned by the second adhesive region 222. The first non-adhesive region 261 and the second non-adhesive region 262 are strip-shaped regions. Since in a plan view the first non-adhesive region 261 and the second non-adhesive region 262 are partitioned by the second adhesive region 222, the vibration of the first vibration actuator 251 attached to the first non-adhesive region 261 is less likely to be transmitted to the second non-adhesive region 262 of the transmission panel 230. Similarly, the vibration of the second vibration actuator 252 attached to the second non-adhesive region 262 of the transmission panel 230 is less likely to be transmitted to the first non-adhesive region 261 of the transmission panel 230. This facilitates separation between the vibration caused by the first vibration actuator 251 and the vibration caused by the second vibration actuator 252. At this time, the left/right average vibration ratio of the display speaker 200 is 1.3. Accordingly, the left/right separation of the display speaker 200 is higher than that of the display speaker 800 of the comparative example. According to the display speaker 200, the stereophonic performance is improved.

Unlike the comparative example, in a plan view, the transmission panel 230 and the display panel 210 are not joined at positions where the first vibration actuator 251 and the second vibration actuator 252 are joined to the transmission panel 230. Since in a plan view the transmission panel 230 and the display panel 210 are not joined at the positions where the first vibration actuator 251 and the second vibration actuator 252 are joined to the transmission panel 230, resistance to vibration is prevented and the display panel 210 is easily vibrated. In a plan view, the transmission panel 230 and the display panel 210 are joined between the first vibration actuator 251 and the second vibration actuator 252. Accordingly, the vibration of the first vibration actuator 251 and the vibration of the second vibration actuator 252 are less likely to be mixed on the transmission panel 230.

That is, in the display speaker 200 of the present embodiment, since the two non-adhesive regions are provided between the transmission panel 230 and the display panel 210 in a manner partitioned by the adhesive regions in a plan view, the quality of the sound output from the display speaker 200 (in particular, the separation of the left and right channels of the stereophonic sound) can be enhanced. In particular, in the related art, when a plurality of vibration actuators are coupled to one vibration panel to output stereophonic sound, a rib (wall) may be provided on the vibration panel to partition the vibration actuators so that vibrations by the left and right vibration actuators are not mixed on the vibration panel, but in the display speaker 200 of the present embodiment, it is not necessary to provide such a wall (rib), which simplifies the structure is simplified and is advantageous for cost reduction.

Figure 11:
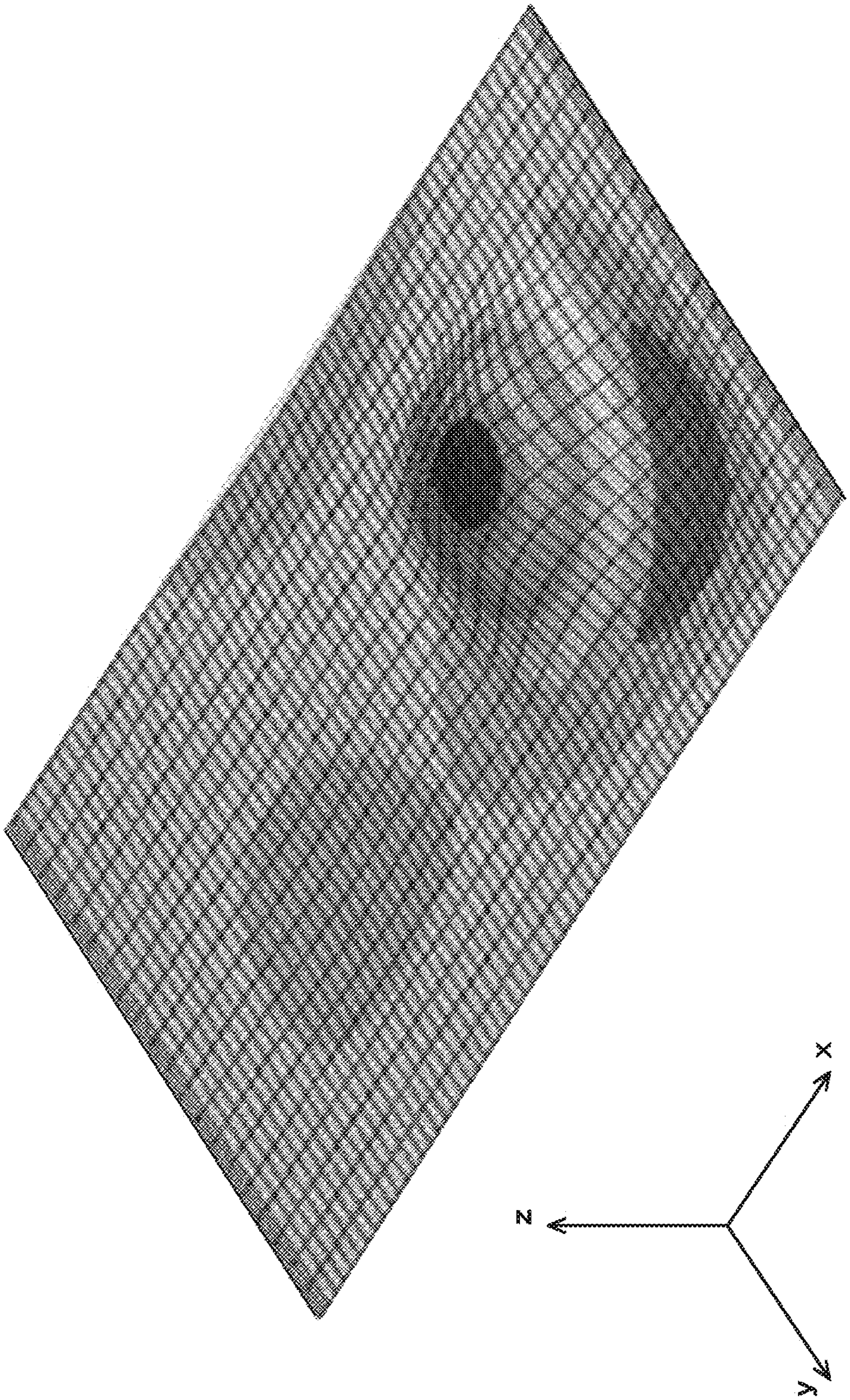
FIG. 11 is a diagram (1) illustrating simulation results of vibration of the transmission panel 230 (display panel 210) of the display speaker 200 of the present embodiment.
Figure 12:
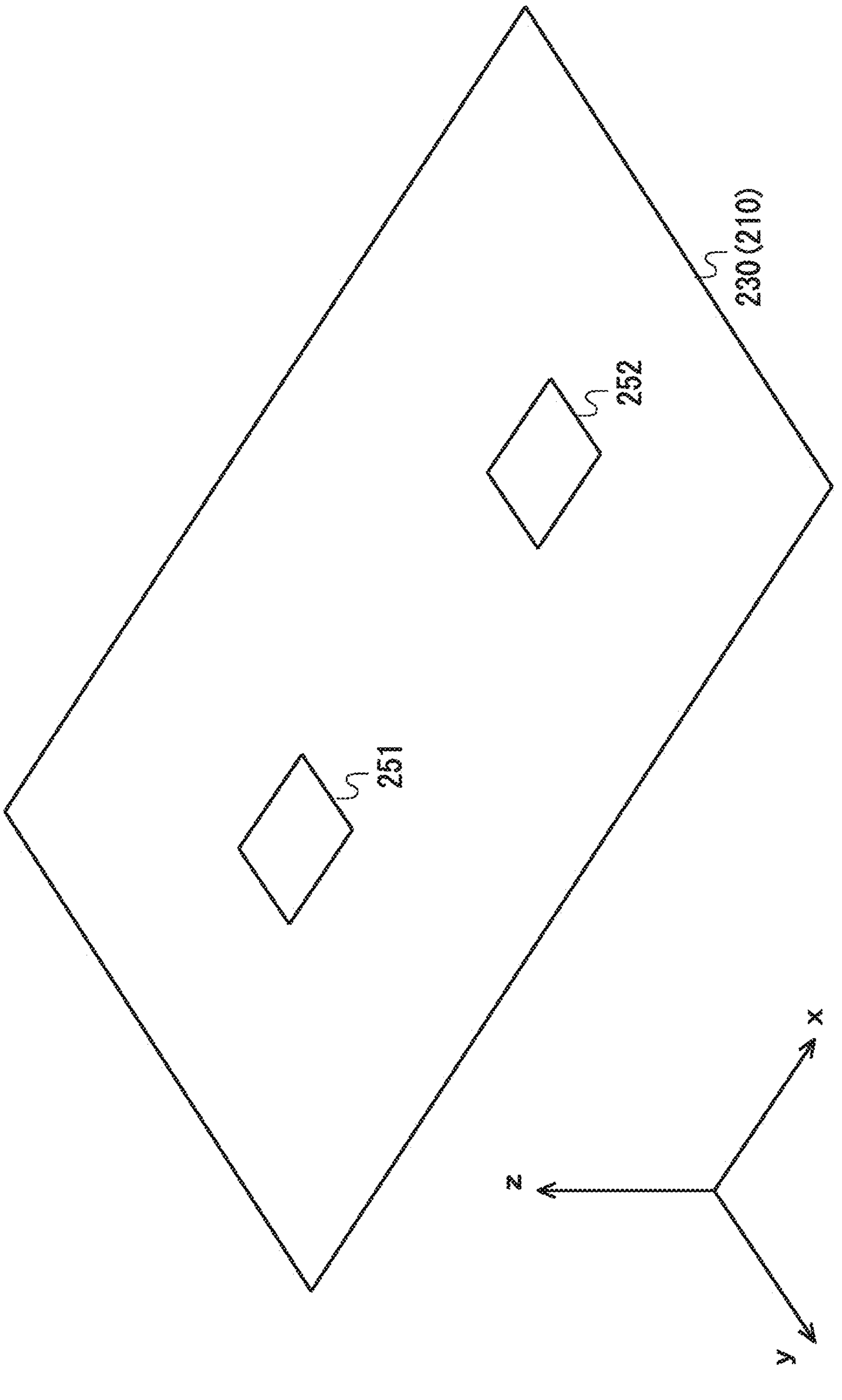
FIG. 12 is a diagram (2) illustrating simulation results of vibration of the transmission panel 230 (display panel 210) of the display speaker 200 of the present embodiment.

FIGS. 11 and 12 are diagrams illustrating simulation results of vibration of the transmission panel 230 (display panel 210) of the display speaker 200 of the present embodiment. FIG. 11 illustrates a graph of simulation results, and an area of the graph of FIG. 11 (parallel quadrilateral area) corresponds to the transmission panel 230 (or the display panel 210) illustrated in FIG. 12. The z-axis direction of the graph represents the amplitude or acceleration of vibration. FIG. 11 shows the vibration of the transmission panel 230 (or the display panel 210) when the second vibration actuator 252 is vibrated and the first vibration actuator 251 is not vibrated. In FIG. 11, there is a peak at a position corresponding to the second vibration actuator 252 in the graph, which indicates that a large amplitude or acceleration of the vibration, while there is no peak at a position corresponding to the first vibration actuator 251 in the graph, which indicates that a small amplitude or acceleration of the vibration. That is, it can be seen that the left/right average vibration ratio of the display speaker 200 is large.

[First Modification]

Next, a first modification will be described. The first modification is in common with the above-described configuration example. Accordingly, different points will be mainly described, and description of common points will be omitted. The same reference numerals are used for components having the same configurations as those of the above-described configuration example.

Figure 7:
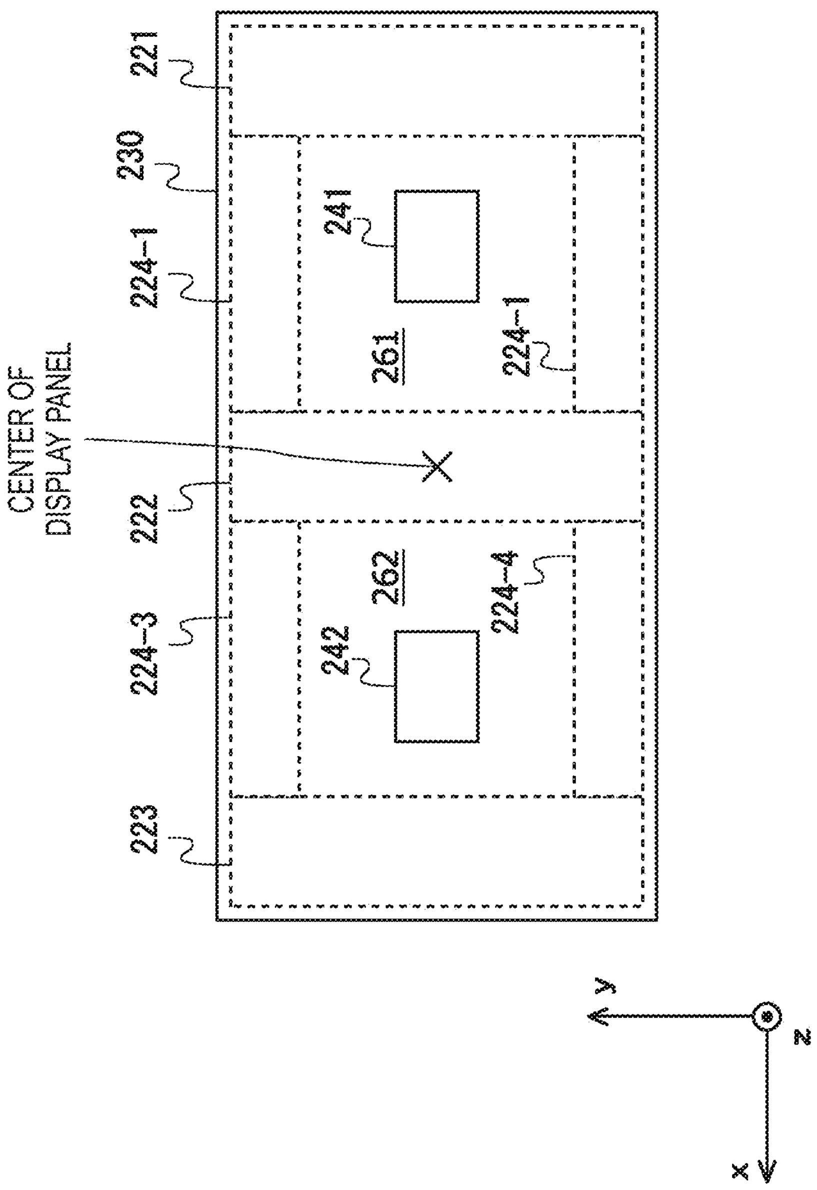
FIG. 7 is a back view of the transmission panel 230, the adhesive layer 220, the first coupling portion 241, and the second coupling portion 242 of the display speaker 200 according to a first modification.

FIG. 7 is a back view of the transmission panel 230, the adhesive layer 220, the first coupling portion 241, and the second coupling portion 242 of the display speaker 200 according to the first modification. Similar to the above configuration example, the display speaker 200 of the first modification includes the adhesive layer 220 including the first adhesive region 221, the second adhesive region 222, and the third adhesive region 223. The adhesive layer 220 includes an adhesive region 224-1 connecting the upper portion of the first adhesive region 221 and the upper portion of the second adhesive region 222, and an adhesive region 224-2 connecting the lower portion of the first adhesive region 221 and the lower portion of the second adhesive region 222. The adhesive layer 220 includes an adhesive region 224-3 connecting the upper portion of the third adhesive region 223 and the upper portion of the second adhesive region 222, and an adhesive region 224-4 connecting the lower portion of the third adhesive region 223 and the lower portion of the second adhesive region 222. The adhesive region 224-1, the adhesive region 224-2, the adhesive region 224-3, and the adhesive region 224-4 are strip-shaped rectangles parallel to the x-axis. The first non-adhesive region 261 is a region surrounded by the first adhesive region 221, the second adhesive region 222, the adhesive region 224-1, and the adhesive region 224-2. The second non-adhesive region 262 is a region surrounded by the third adhesive region 223, the second adhesive region 222, the adhesive region 224-3, and the adhesive region 224-4. Surrounding the non-adhesive regions by the adhesive regions further facilitates separation between the vibration caused by the first vibration actuator 251 and the vibration caused by the second vibration actuator 252. The left/right average vibration ratio of the display speaker 200 of the first modification is 1.6.

[Second Modification]

Next, a second modification will be described. The second modification is in common with the above-described configuration example. Accordingly, different points will be mainly described, and description of common points will be omitted. The same reference numerals are used for components having the same configurations as those of the above-described configuration example.

Figure 8:
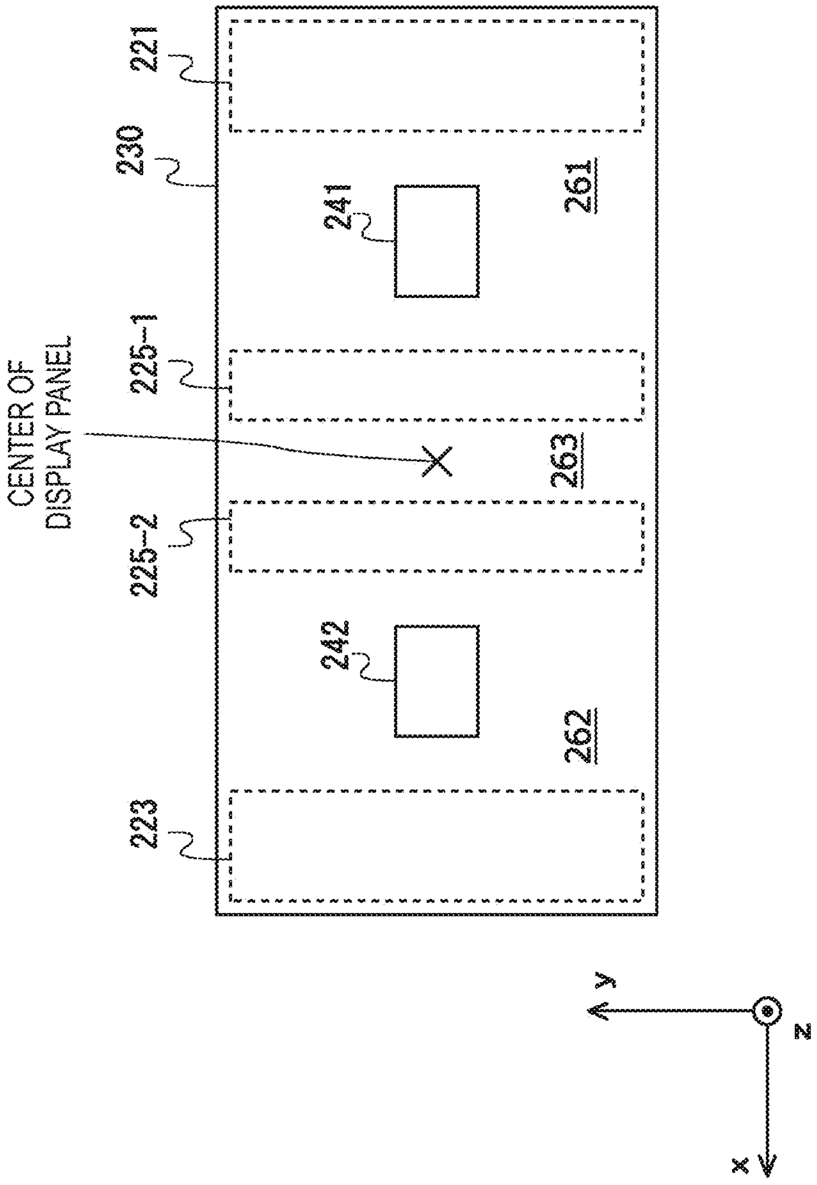
FIG. 8 is a back view of the transmission panel 230, the adhesive layer 220, the first coupling portion 241, and the second coupling portion 242 of the display speaker 200 according to a second modification.

FIG. 8 is a back view of the transmission panel 230, the adhesive layer 220, the first coupling portion 241, and the second coupling portion 242 of the display speaker 200 according to the second modification. Similar to the above configuration example, the display speaker 200 of the second modification includes the adhesive layer 220 including the first adhesive region 221 and the third adhesive region 223. The adhesive layer 220 includes an adhesive region 225-1 and an adhesive region 225-2 instead of the second adhesive region 222. The adhesive regions 225-1 and 225-2 are strip-shaped rectangles parallel to the y-axis. The adhesive regions 225-1 and 225-2 extend from the upper portion to the lower portion of the display panel 210 (transmission panel 230). In the x direction, the distance between the adhesive region 225-1 and the center of the display panel 210 is equal to the distance between the adhesive region 225-2 and the center of the display panel 210. The adhesive region 225-1 is disposed on the −x side from the center of the display panel 210. The adhesive region 225-2 is disposed on the +x side from the center of the display panel 210. A non-adhesive region 263 is provided between the adhesive region 225-1 and the adhesive region 225-2. The first non-adhesive region 261 is a region surrounded by the first adhesive region 221 and the adhesive region 225-1. The second non-adhesive region 262 is a region surrounded by the third adhesive region 223 and the adhesive region 225-2. Separating the first non-adhesive region 261 and the second non-adhesive region 262 by the adhesive region 225-1, the non-adhesive region 263, and the adhesive region 225-2, further facilitates separation between the vibration caused by the first vibration actuator 251 and the vibration caused by the second vibration actuator 252.

[Third Modification]

Next, a third modification will be described. The third modification is in common with the above-described first modification. Accordingly, different points will be mainly described, and description of common points will be omitted. The same reference numerals are used for components having the same configurations as those of the above-described first modification.

Figure 9:
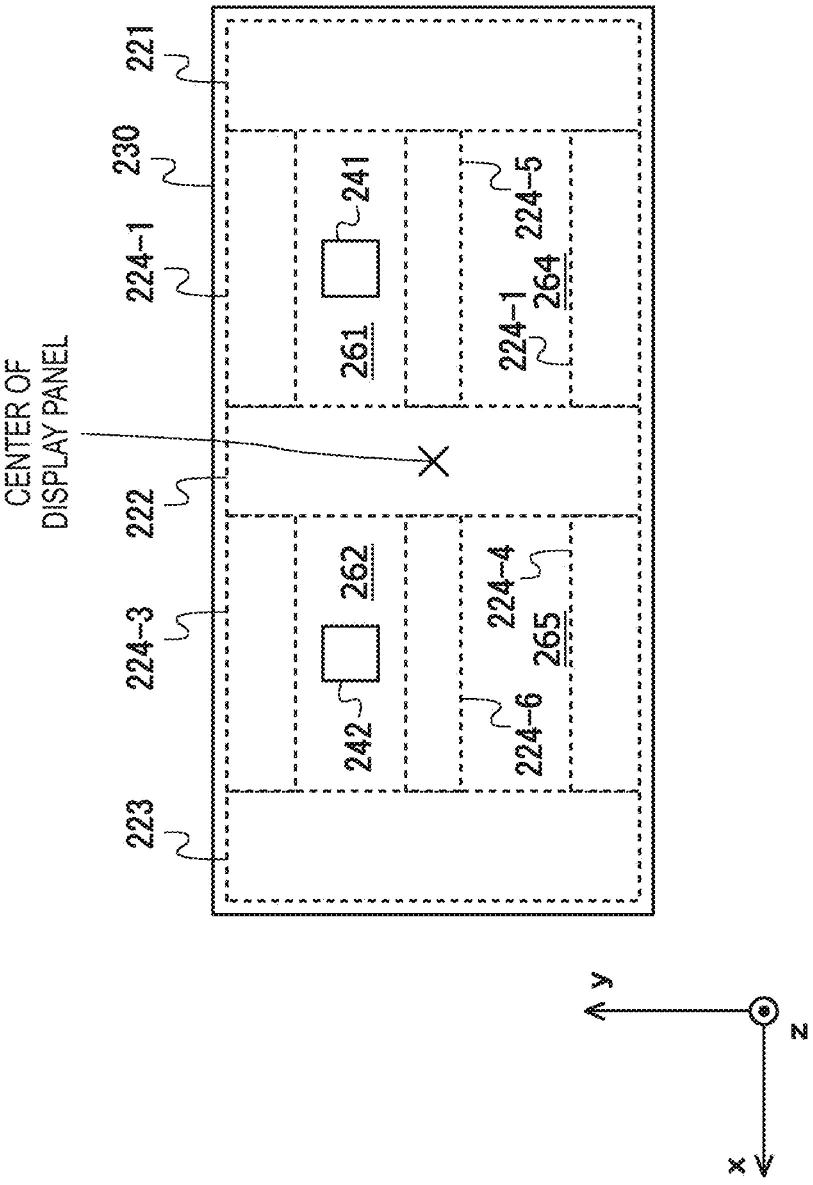
FIG. 9 is a back view of the transmission panel 230, the adhesive layer 220, the first coupling portion 241, and the second coupling portion 242 of the display speaker 200 according to a third modification.

FIG. 9 is a back view of the transmission panel 230, the adhesive layer 220, the first coupling portion 241, and the second coupling portion 242 of the display speaker 200 according to the third modification. Similarly to the first modification, the display speaker 200 of the third modification includes the adhesive layer 220 including the first adhesive region 221, the second adhesive region 222, the third adhesive region 223, the adhesive region 224-1, the adhesive region 224-2, the adhesive region 224-3, and the adhesive region 224-4. In addition, the adhesive layer 220 includes an adhesive region 224-5 connecting the central portion of the first adhesive region 221 and the central portion of the second adhesive region 222, and an adhesive region 224-6 connecting the central portion of the third adhesive region 223 and the central portion of the second adhesive region 222. The adhesive regions 224-5 and 224-6 are strip-shaped rectangles parallel to the x-axis. The first non-adhesive region 261 is a region surrounded by the first adhesive region 221, the second adhesive region 222, the adhesive region 224-1, and the adhesive region 224-5. The second non-adhesive region 262 is a region surrounded by the third adhesive region 223, the second adhesive region 222, the adhesive region 224-3, and the adhesive region 224-6. The non-adhesive region 264 is a region surrounded by the first adhesive region 221, the second adhesive region 222, the adhesive region 224-2, and the adhesive region 224-5. The non-adhesive region 265 is a region surrounded by the third adhesive region 223, the second adhesive region 222, the adhesive region 224-4, and the adhesive region 224-6. Vibration actuators (coupling portions) may also be disposed in the non-adhesive region 264 and the non-adhesive region 265. The adhesive regions 224-1, 224-2, 224-3, and 224-4 may be omitted. Here, four grid-shaped non-adhesive regions are provided, but more grid-shaped non-adhesive regions may be arranged by providing more adhesive regions. Some non-adhesive regions may be not provided with vibration actuators (coupling portions).

[Fourth Modification]

Next, a fourth modification will be described. The fourth modification is in common with the above-described configuration example. Accordingly, different points will be mainly described, and description of common points will be omitted. The same reference numerals are used for components having the same configurations as those of the above-described configuration example.

Figure 10:
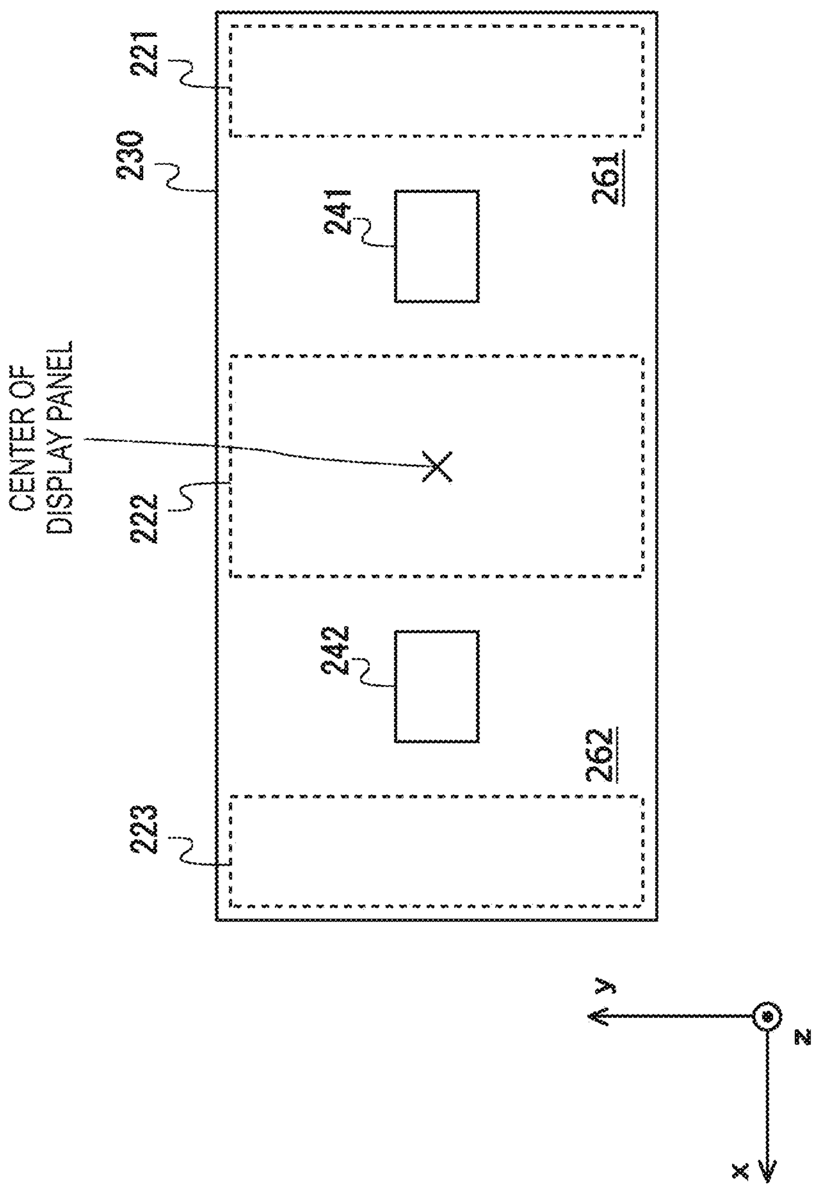
FIG. 10 is a back view of the transmission panel 230, the adhesive layer 220, the first coupling portion 241, and the second coupling portion 242 of the display speaker 200 according to a fourth modification.

FIG. 10 is a back view of the transmission panel 230, the adhesive layer 220, the first coupling portion 241, and the second coupling portion 242 of the display speaker 200 according to the fourth modification. Similar to the above configuration example, the display speaker 200 of the fourth modification includes the adhesive layer 220 including the first adhesive region 221, the second adhesive region 222, and the third adhesive region 223. The width of the second adhesive region 222 in the x direction is larger than the width of the first adhesive region 221 and the third adhesive region 223 in the x direction. For example, the width of the second adhesive region 222 in the x direction is twice the width of the first adhesive region 221 and the third adhesive region 223 in the x direction. Increasing the width of the second adhesive region 222 in the x direction further facilitates separation between the vibration caused by the first vibration actuator 251 and the vibration caused by the second vibration actuator 252.

[Others]

The non-adhesive regions may not be completely separated by the adhesive regions, and adjacent non-adhesive regions may be connected to each other by a non-adhesive portion provided in the adhesive regions. The non-adhesive portion provided in the adhesive regions does not exceed, for example, half the area of the adhesive regions. The adhesive regions around the display panel 210 (for example, the first adhesive region 221, the third adhesive region 223, or the like) may be provided with a non-adhesive portion. Increasing the size of the non-adhesive regions and the non-adhesive portions further facilitates the vibration of the transmission panel 230.

Here, the display speaker 200 outputs stereophonic sound, but sound related to an image (object) displayed on the display panel 210 may be output in conjunction with the image from the position of the image. That is, the display speaker 200 outputs sound related to the image from the position of the image by inputting a signal of sound related to the image to the vibration actuator present at the position of the image in a plan view.

Operation and Effects of Embodiments

The display speaker 200 of the present embodiment includes the display panel 210, the adhesive layer 220, the transmission panel 230, the first coupling portion 241, the second coupling portion 242, the first vibration actuator 251, and the second vibration actuator 252. The back side of the display panel 210 and the front side of the transmission panel 230 are joined to each other via the adhesive layer 220. The back side of the transmission panel 230 and the front sides of the first vibration actuator 251 and the second vibration actuator 252 are joined to each other via the first coupling portion 241 and the second coupling portion 242. The adhesive layer 220 includes a plurality of strip-shaped regions. The adhesive regions of the adhesive layer 220 do not overlap with the coupling portions in a plan view. The coupling portions are arranged in the non-adhesive regions in a plan view. Since in a plan view the transmission panel 230 and the display panel 210 are not joined at the positions where the vibration actuators are joined to the transmission panel 230, resistance to vibration is prevented and the display panel 210 is easily vibrated. Separating the first non-adhesive region 261 and the second non-adhesive region 262 facilitates separation between the vibration caused by the first vibration actuator 251 and the vibration caused by the second vibration actuator 252. That is, the vibration caused by the first vibration actuator 251 and the vibration caused by the second vibration actuator 252 are less likely to interfere with each other. This improves separation of sound output from the display speaker 200 having the single display panel 210. According to the display speaker 200, it is possible to provide a panel speaker that separates the left and right signals to improve the quality of output stereophonic sound. In addition, according to the display speaker 200, it is not necessary to provide a rib (wall) on the vibration panel to partition the vibration actuators as in the related art.

Although the embodiment of the present invention has been described above, this embodiment is merely an example, the present invention is not limited thereto, and various modifications based on the knowledge of those skilled in the art can be made without departing from the gist of the claims. The above configuration examples and modifications can be implemented in combination as much as possible.

REFERENCE SIGNS LIST

200 display speaker
210 display panel
220 adhesive layer
221 first adhesive region
222 second adhesive region
230 transmission panel
241 first coupling portion
242 second coupling portion
251 first vibration actuator
252 second vibration actuator
800 display speaker of comparative example
810 display panel
820 adhesive layer
830 transmission panel
841 first coupling portion
842 second coupling portion
851 first vibration actuator
852 second vibration actuator

What is claimed is:

1. A panel speaker comprising:

a single vibration panel formed by adhering to each other one surface of a first panel and one surface of a second panel;

a first vibration actuator configured to drive and vibrate the single vibration panel; and a second vibration actuator configured to drive and vibrate the single vibration panel, wherein the single vibration panel has, in a plan view, a first non-adhesive region and a second non-adhesive region in both of which the first panel and the second panel are not bonded to each other, the first vibration actuator is coupled to another surface of the second panel to drive the first non-adhesive region of the single vibration panel, and the second vibration actuator is coupled to the other surface of the second panel to drive the second non-adhesive region of the single vibration panel, and the first vibration actuator and the second vibration actuator are not directly coupled to the first panel.

2. The panel speaker according to claim 1, wherein the first non-adhesive region and the second non-adhesive region are arranged, in the plan view, at both sides of a virtual straight line passing through a center in a longitudinal direction of the single vibration panel and being orthogonal to the longitudinal direction.

3. The panel speaker according to claim 2, wherein the first non-adhesive region and the second non-adhesive region are arranged, in the plan view, in line symmetry with respect to the virtual straight line.

4. The panel speaker according to claim 3, wherein the first vibration actuator is configured to receive a left sound signal of stereophonic sound, and the second vibration actuator is configured to receive a right sound signal of stereophonic sound.

5. The panel speaker according to claim 3, wherein the single vibration panel includes a third non-adhesive region that, in the plan view, separates the first non-adhesive region and the second non-adhesive region from each other.

6. The panel speaker according to claim 3, wherein the single vibration panel has a plurality of non-adhesive regions in each of which the first panel and the second panel are not bonded to each other, and the plurality of non-adhesive regions are, in the plan view, partitioned in a lattice shape and include the first non-adhesive region and the second non-adhesive region.

7. The panel speaker according to claim 3, wherein the first panel is a display panel.

8. The panel speaker according to claim 7, wherein the first panel is an organic light emitting diode panel.

9. The panel speaker according to claim 2, wherein the first vibration actuator is configured to receive a left sound signal of stereophonic sound, and the second vibration actuator is configured to receive a right sound signal of stereophonic sound.

10. The panel speaker according to claim 2, wherein the single vibration panel includes a third non-adhesive region that, in the plan view, separates the first non-adhesive region and the second non-adhesive region from each other.

11. The panel speaker according to claim 2, wherein the single vibration panel has a plurality of non-adhesive regions in each of which the first panel and the second panel are not bonded to each other, and the plurality of non-adhesive regions are, in the plan view, partitioned in a lattice shape and include the first non-adhesive region and the second non-adhesive region.

12. The panel speaker according to claim 2, wherein the first panel is a display panel.

13. The panel speaker according to claim 12, wherein the first panel is an organic light emitting diode panel.

14. The panel speaker according to claim 1, wherein the first vibration actuator is configured to receive a left sound signal of stereophonic sound, and the second vibration actuator is configured to receive a right sound signal of stereophonic sound.

15. The panel speaker according to claim 1, wherein the single vibration panel includes a third non-adhesive region that, in the plan view, separates the first non-adhesive region and the second non-adhesive region from each other.

16. The panel speaker according to claim 1, wherein the single vibration panel has a plurality of non-adhesive regions in each of which the first panel and the second panel are not bonded to each other, and the plurality of non-adhesive regions are, in the plan view, partitioned in a lattice shape and include the first non-adhesive region and the second non-adhesive region.

17. The panel speaker according to claim 1, wherein the first panel is a display panel.

18. The panel speaker according to claim 17, wherein the first panel is an organic light emitting diode panel.

19. A display panel speaker for a-stereo sound, comprising:

a display panel;

a vibration propagation panel;

stripe shaped first, second and third adhesive patterns formed between the display panel and the vibration propagation panel;

a first vibration actuator that (i) is disposed between the first and the second adhesive patterns, (ii) is adhered to the vibration propagation panel to drive and vibrate the vibration propagation panel, and (iii) is not directly adhered to the display panel; and a second vibration actuator that (i) is disposed between the second and the third adhesive patterns, (ii) is adhered to the vibration propagation panel to drive and vibrate the vibration propagation panel, and (iii) is not directly adhered to the display panel.

* * * * *